United States Patent [19]

Fujita et al.

[11] Patent Number: 5,439,755
[45] Date of Patent: * Aug. 8, 1995

[54] MAGNETIC RECORDING MEDIUM COMPRISING A MAGNETIC RECORDING LAYER, AN INTERMEDIATE LAYER, A METALLIC THERMAL RECORDING LAYER AND A PROTECTIVE LAYER

[75] Inventors: Minoru Fujita; Kenji Sugaya; Yoshihiko Nakahara, all of Tokyo, Japan

[73] Assignee: Kyodo Printing Co., Ltd., Tokyo, Japan

[*] Notice: The portion of the term of this patent subsequent to Dec. 17, 2008 has been disclaimed.

[21] Appl. No.: 205,136

[22] Filed: Mar. 1, 1994

Related U.S. Application Data

[63] Continuation of Ser. No. 9,415, Jan. 27, 1993, abandoned, which is a continuation of Ser. No. 821,127, Jan. 14, 1992, abandoned, which is a continuation of Ser. No. 365,198, Jun. 12, 1989, abandoned.

[30] Foreign Application Priority Data

Jun. 17, 1988 [JP] Japan ................... 63-148352

[51] Int. Cl.⁶ ............................................. G11B 5/00
[52] U.S. Cl. ............................... 428/694 BP; 428/900;
428/913; 235/493; 360/2; 369/14; 369/15;
347/221; 283/55; 283/60.1; 283/60.2; 283/82;
283/900; 283/901; 283/904
[58] Field of Search ......... 428/694, 900, 913, 694 BP;
360/2; 369/15, 14; 346/76 L, 76 R, 76 PH;
235/493; 283/82, 55, 60.1, 60.2, 900, 901, 904

[56] References Cited

U.S. PATENT DOCUMENTS

| | | | |
|---|---|---|---|
| 2,258,106 | 5/1937 | Bryce | 234/1.5 |
| 3,239,841 | 3/1966 | Henkes, Jr. | 283/904 |
| 3,911,444 | 10/1975 | Lou et al. | 346/1 |
| 4,098,935 | 7/1978 | Knudsen | 428/40 |
| 4,360,728 | 11/1982 | Drexler | 235/462 |
| 4,551,738 | 11/1985 | Maruta | 346/200 |
| 4,670,323 | 6/1987 | Nakamura et al. | 428/172 |
| 4,711,996 | 12/1987 | Drexler | 235/468 |
| 5,073,787 | 12/1991 | Fujita et al. | 346/135.1 |

FOREIGN PATENT DOCUMENTS

| | | |
|---|---|---|
| 60-52390 | 7/1985 | Japan . |
| 60288297 | 10/1988 | Japan . |
| 1214488 | 8/1989 | Japan . |
| 1299089 | 12/1989 | Japan . |

Primary Examiner—Stevan A. Resan
Attorney, Agent, or Firm—Baker & Daniels

[57] ABSTRACT

This invention provides a magnetic recording medium wherein visible patterns can be written, in which a heat sensitive layer is formed on a magnetic recording layer and a metallic thin layer is formed on said heat sensitive layer. The metallic thin layer of said magnetic recording medium can by roughed by using a material containing minute particles to form a roughed heat sensitive layer on the magnetic recording layer and then depositing the metallic thin layer on said heat sensitive layer. In using said magnetic recording medium, information corresponding to at least a part of the information recorded in the magnetic recording layer can be written as visible patterns.

12 Claims, 3 Drawing Sheets

FIG.6(a)

| DATE (16a) | CHARGE (16b) | REMAINDER (16c) |
|---|---|---|
| | | |

| DATE (16a) | CHARGE (16b) | REMAINDER (16c) |
|---|---|---|
| 89. 1. 7 (22a) | 600 | 9400 (22c) |
| 89. 2.13 (22b) | 1500 | 7900 |

16d

MAGNETIC RECORDING MEDIUM COMPRISING A MAGNETIC RECORDING LAYER, AN INTERMEDIATE LAYER, A METALLIC THERMAL RECORDING LAYER AND A PROTECTIVE LAYER

This is a continuation of application Ser. No. 08/009,415, filed on Jan. 27, 1993, now abandoned, which is a continuation of application Ser. No. 07/821,127, filed on Jan. 14, 1992, now abandoned, which is a continuation of application Ser. No. 07/365,198, filed Jun. 12, 1989, now abandoned.

BACKGROUND OF THE INVENTION

This invention relates to a magnetic recording medium, specifically a magnetic recording medium in the surface of which visible patterns (information) can be written, its production method and its use.

This invention can be effectively applied to magnetic cards including prepaid cards such as a telephone card wherein figures and the like corresponding to the contents of magnetic recording are printed to enable the magnetically recorded contents of said recording medium to be macroscopically seen.

Magnetic cards are handy to carry and are widely used as useful cards. They have a magnetic recording layer formed on a desired area of the surface of a card base with proper thickness.

Magnetically recorded information such as the frequency of use and the remainder can not be macroscopically seen in a magnetic card and therefore the remainder was indicated by punched holes and the like in a prepaid magnetic card. However, since the precise remainder is not indicated, cash or another magnetic card must be used when the remainder is insufficient. It is sometimes required to print the frequency of use, the remainder and the like on the card surface in order to avoid such a situation.

Conventionally, printing is generally performed on the surface of a magnetic card opposite to its magnetic recording layer by a wire dot print head through a pressure sensitive ink ribbon, by a thermal print head through a heat sensitive ink ribbon or by applying a thermal print head to a heat sensitive recording layer formed on the card surface. However, a desired design is generally printed on the surface of the magnetic card opposite to its magnetic recording layer and a wide area for the above printing is not desirable in terms of the above design.

Conventionally, printing is performed on the side of the magnetic recording layer of the magnetic card in some cases and in such cases the magnetic recording layer is partially formed on the card base and printing is performed on an area different from said recording layer. Therefore, it is impossible to make both the magnetic recording area and the printing area sufficiently large.

When a heat sensitive recording layer is formed on the card surface, since the recording layer is deteriorated (changes with the passing of time) by the accumulation of external heat energy, the contents of recording (visible patterns) are hard to see and recording is difficult.

Recently, magnetic cards wherein a larger amount of information is recorded have come to be used and therefore it is desirable that the magnetic recording area be large and the printing area be as large as possible. Furthermore, since it is desirable that printed letters be as large as possible to enable easy reading, it is preferable that the printing area be as large as possible from this point of view as well.

SUMMARY OF THE INVENTION

Accordingly, it is an object of this invention to provide a magnetic recording medium wherein visible patterns (information) including letters, marks and figures can be written on a magnetic recording layer and to provide a visible pattern (information) area which does not change with the passing of time.

It is another object of this invention to provide a method for using such a magnetic recording medium.

According to this invention, the above objects are achieved by magnetic recording medium wherein visible patterns can be written, in which a heat sensitive layer is formed on a magnetic recording layer and a metallic thin layer is formed on said heat sensitive layer, and by roughing the metallic thin layer.

Furthermore, according to this invention, the above objects are achieved by a method for producing a magnetic recording medium having a roughed metallic thin layer which is characterized by using a material containing minute particles to form a roughed heat sensitive layer on a magnetic recording layer and depositing the metallic thin layer on said heat sensitive layer.

According to this invention, the above objects are achieved by a method for using the above magnetic recording medium of this invention which is characterized by writing information corresponding to at least a part of the information recorded in the magnetic recording layer as visible patterns.

BRIEF DESCRIPTION OF THE DRAWINGS

FIGS. 6(a) and (b) are plan views for explaining the formation of indications produced by writing visible patterns in the magnetic recording medium of this invention.

DETAILED DESCRIPTION OF THE INVENTION

Figure 1:
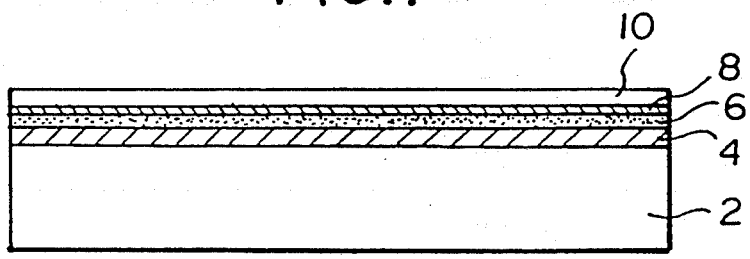
FIGS. 1, 4 and 5 are rough cross-sectional views of the main parts of magnetic recording media of this invention.

Examples of this invention will be explained while referring to the drawings in the following.

FIG. 1 is a rough cross-sectional views of the main part of a magnetic card which is an example of the magnetic recording medium of this invention.

In FIG. 1, a magnetic recording layer 4 is formed on the entire surface (upper surface) of a base 2, a heat sensitive layer 6 is formed on said magnetic recording layer, a metallic thin layer 8 is formed on said heat sensitive layer and a wear-resistant layer 10 is formed on said metallic thin layer.

For the above base 2, synthetic paper, sheets of synthetic resins such as polyethylene terephthalates, epoxy resins, polyvinyl chlorides and polycarbonates and similar materials can be used.

For the above magnetic recording layer 4, those conventionally used as a magnetic recording layer in this type of magnetic recording medium can be used. For example, Ba-ferrite, Sr-ferrite, Co-coated $\gamma$-$Fe_2O_3$, $\gamma$-$Fe_2O_3$, needle-like iron powder or $CrO_2$ with particle size of 10 μm or less preferably 0.01~5 μm can be used as a magnetic material and a commonly used polyester, alkyd, vinyl or polyurethane resin or a mixture of at least two of these resins can be used as a binder resin. The ratio of the binder resin to the magnetic material is properly set by considering adhesiveness to the base, paint film strength, voltage detected by a magnetic head, and the like. The ratio by weight of the binder resin to the magnetic material can be in the range of 1/1~1/10 for example and is preferably 1/2~1/8. The thickness of said magnetic recording layer 4 is about 10~15 μm for example.

The above heat sensitive layer 6 is provided in order to improve the writing and recording characteristics of the metallic thin layer 8 (sensitization effect). For a heat sensitive material used to form the heat sensitive layer 6, self-oxidization resins such as nitrocellulose resins as well as thermoplastic resins such as acrylic resins, polyester resins, polyvinylchloride resins, vinyl acetate resins, polystyrene resins and polybutyral resins can be used. The thickness of said heat sensitive layer 6 is 10 μm or less for example and preferably about 0.5~3 μm.

The above metallic thin layer 8 covers the magnetic recording layer 4 and is used as a writing recording film. For a metallic material used to form the metallic thin layer 8, low melting point metals such as Sn, Bi Se, Te and Zn can be used for example. The thickness of said metallic thin layer 8 is about 50~5,000 Å for example and preferably about 200 1,000 Å.

For the above wear-resistant layer 10, those conventionally used as a wear-resistant layer in this type of magnetic recording medium, for example, cellulose resins, urethane resins, polyester resins, vinyl resins, epoxy resins and acrylic resins can be used. To such a resin, a phthalic acid ester, an ester of fatty acid, an orthophosphoric acid ester or a similar compound can be added as a plasticizer and oleylamide, stearylamide, a silicone or a similar compound can be added to give smoothness. In addition, when the resin is applied as a coating to the metallic thin layer 8, a solvent which does not damage the above metallic thin layer 8 and heat sensitive layer 6 and is properly selected from solvents such as glycol ethers and alcohols must be used. The amount of the solvent used can be reduced by employing an ultraviolet-ray-cured resin or an electron-ray-cured resin. An acrylic, epoxy, polyester or similar resin can be used as said ultraviolet-ray-cured resin. The thickness of said wear-resistant layer 10 is 10 μm or less for example and preferably about 1~5 μm.

FIGS. 2(a)~(d) indicate production processes for such a magnetic card as mentioned above. A production example will be described according to these drawings in the following.

Figure 2A:
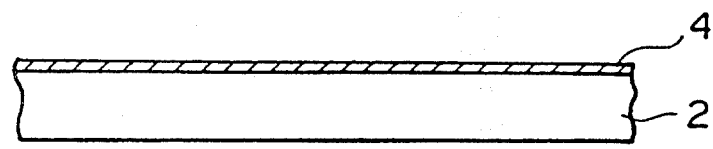
FIGS. 2(a)~(d) indicate the production processes for the magnetic recording medium of this invention.

As shown in FIG. 2(a), a magnetic sheet was prepared by forming a magnetic recording layer 4 with 10 μm thickness, 2750 Oe coercive force and 1.4 Mx/cm residual magnetization in which Ba-ferrite was used as the magnetic material on a white polyethylene terephthalate film 1 with 188 μm thickness.

Figure 2B:
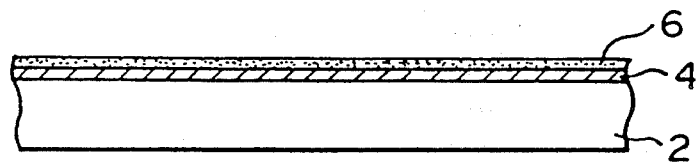

Next, as shown in FIG. 2(b), a heat sensitive layer 6 with 2 μm thickness was formed on the magnetic recording layer 4. Said heat sensitive layer was formed by

| | |
|---|---|
| Vinylchloride acetate polyester resin | 20 pwt |

-continued

| | |
|---|---|
| Low molecular weight polyethylene powder | 2 pwt |
| Phthalic acid ester plasticizer | 1.5 pwt |
| Methyl ethyl ketone | 40 pwt |
| Toluene | 40 pwt | preparing a coating of the above composition, applying the coating to the magnetic recording layer 4 using a roller coater and then drying the applied coating in an oven at 100° C. for one minute.

Here, the above low molecular weight polyethylene powder is used as minute particles for roughing the surface of the heat sensitive layer 6. That is to say, when said heat sensitive layer has been roughed, a metallic thin layer 8 is easily roughed during its formation in the following process and as the result diffuse reflection by said metallic thin layer is increased, homogeneous white is obtained, the contrast between the metallic thin layer 8 and the magnetic recording layer 4 is improved and visible patterns can be easily seen macroscopically. For this purpose, the surface roughness (Ra in JIS B 0601) of the metallic thin layer 8 is 0.1~2.0 μm for example and preferably 0.3~1.0 μm. A polyimide resin powder, a low molecular weight tetrafluoroethylene resin powder, calcium stearate, tin stearate, a polystyrene latex, bentonite, wollastonite, talc, aluminum silicate, sericite, kaolin clay, white carbon, calcium carbonate, chalk, slaked lime, dolomite powder, magnesium carbonate, barium sulfate or a similar substance can also be used as minute particles for roughing the heat sensitive layer 6. The mean particle size of said minute particles is 0.3~10 μm for example and preferably 0.6~5.0 μm. Fifty parts by weight or less preferably 20 parts by weight or less of said minute particles are used for 100 parts by weight of the resin.

The above plasticizer is added to increase the sensitivity of the heat sensitive layer 6. A plasticizer compatible with the resin can be selected from various plasticizers such as phthalic acid derivatives, adipic acid derivatives, maleic acid derivatives and stearic acid derivatives as the plasticizer used for this purpose. It is preferable that 10 parts by weight or less of said plasticizer be used for 100 parts by weight of the resin.

| | |
|---|---|
| The above heat sensitive layer 6 can also be Nitrocellulose | 20 pwt |
| Low molecular weight polyethylene powder | 2 pwt |
| Methyl ethyl ketone | 40 pwt |
| Toluene | 40 pwt | formed by using a coating of the above composition.

Figure 2C:
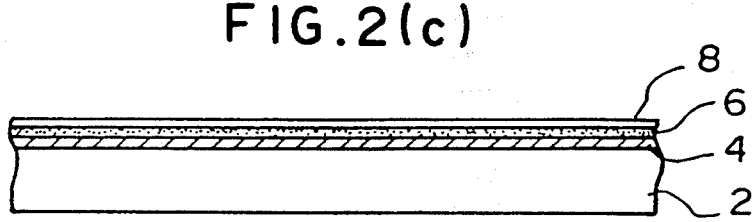

Next, as shown in FIG. 2(c), an Sn thin layer 8 with 500 Å thickness was formed on the heat sensitive layer 6 at a rate of 20 Å/sec. by vacuum evaporation coating. Said Sn thin layer had little metallic luster and was nearly white.

Figure 2D:
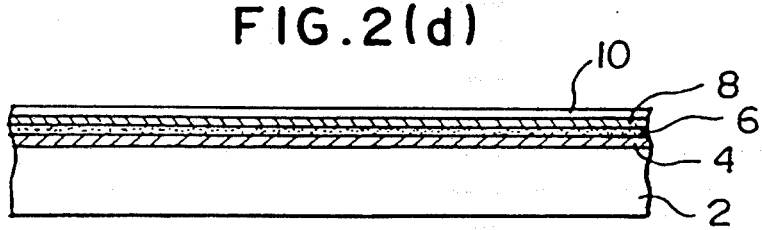

Next, as shown in FIG. 2(d), a wear-resistant layer 10 with 2 μm thickness was formed on the Sn thin layer 8. Said wear-resistant layer was formed by

| | |
|---|---|
| Silicone-acrylic resin | 20 pwt |
| Silicone oil | 0.04 pwt |
| Ethyl cellosolve | 75 pwt |
| Cellulose acetate | 5 pwt | preparing a coating of the above composition, applying the coating to the Sn thin layer 8 using a roller coater and then drying the applied coating in an oven at 120° C. for one minute.

Finally, the thus obtained plate was punched into a given shape to obtain a magnetic card.

Figure 3:
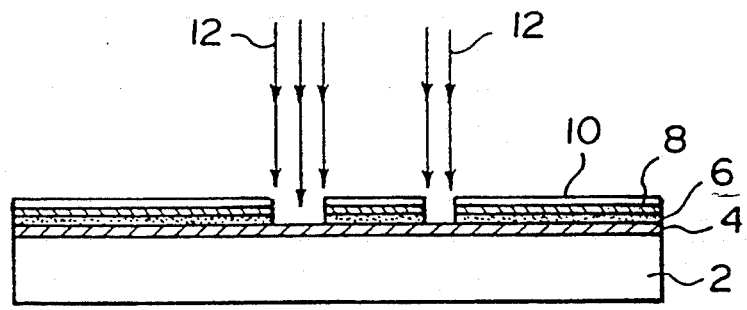
FIG. 3 is a rough cross-sectional view for explaining a method for writing patterns in the magnetic recording medium of this invention.

FIG. 3 is a rough cross-sectional view for explaining a method for writing patterns in the magnetic card of this example mentioned above.

As shown in FIG. 3, when laser beams 12 are irradiated in a desired pattern (a letter for example) from above the wear-resistant layer 10, the heat sensitive layer 6 of the irradiated portion is locally heated, the heat sensitive layer 6, the metallic thin layers 8 and the wear-resistant layer 10 of this portion are removed and the magnetic recording layer 4 is partially exposed. As the result, the nonirradiated portion exhibits a whitish color because its metallic thin layer 8 remains while the irradiated portion exhibits a blackish color of the magnetic recording layer 4. Therefore, a visible pattern (information) is formed in a sufficient contrast.

Such laser beam irradiation can be performed by a laser marker using a carbonic acid gas laser (e.g., LASERMARK System Six manufactured by Lumonics Pacific Company) or a laser marker using Nd:YAG laser (e.g., SL472B manufactured by Nippon Denki Company). Patterns can also be written by heating using a thermal head instead of laser beam irradiation.

Such visible pattern writing as mentioned above is effectively applied to printing records of card usage (dates and charges) and particulars of the remainder in magnetic cards. Specifically, in a magnetic card in which the remainder sum recorded in the magnetic recording layer is revised every time of its use, the details are printed in the surface of the card to enable the user to always know the contents of the card.

In the above example, the color of the magnetic recording layer is effectively utilized in printing information on the metallic thin layer. Specifically, although the heat sensitive layer may not be completely removed even by heating by laser beam irradiation or a similar means, using a transparent material as the heat sensitive layer enables the color of the magnetic recording layer of the heated portion to be macroscopically seen thereby enabling formation of visible patterns (information).

In this invention, however, it is also possible to use a heat sensitive layer the color of which is in a good contrast with the metallic thin layer and to utilize the color of the heat sensitive layer for the formation of visible patterns (information) by not completely removing the heat sensitive layer of the heated portion by heating during use.

Figure 4:
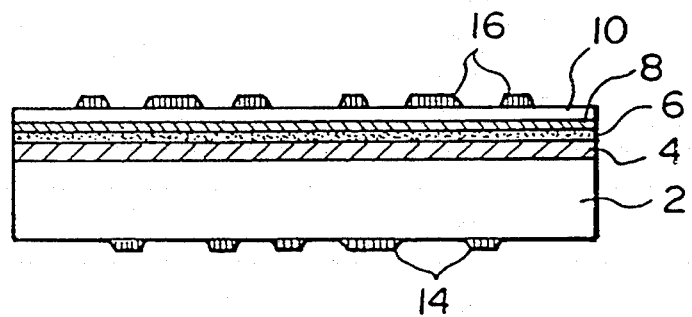
Figure 5:
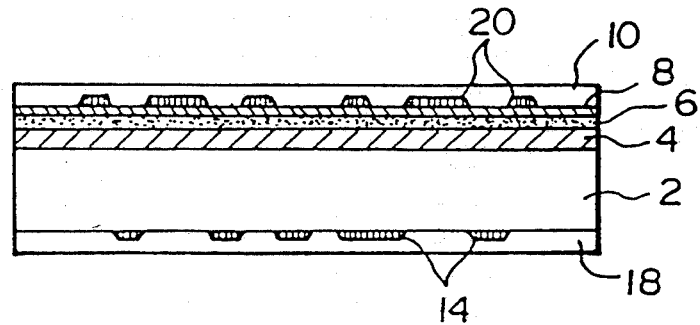

FIGS. 4 and 5 are rough cross-sectional views of the main parts of magnetic cards which are examples of magnetic recording medium of this invention. In these drawings, the same members as those shown in FIG. 1 are represented by the same symbols.

In the example shown in FIG. 4, a desired design 14 is printed on the surface of the base 2 opposite to the magnetic recording layer 4, and a desired design 16 is also printed on the wear-resistant layer 10. The design 16 and visible patterns produced by the above heat writing may synergistically form desired indications.

In the example shown in FIG. 5, a desired design 14 is printed on the surface of the base 2 opposite to the magnetic recording layer 4, and the design 14 is covered by an over coat layer 18. In addition, a desired design 20 is printed on the metallic thin layer 8 and the wear-resistant layer 10 is formed over the design 20. The design 20 has the same effect as the above design 16.

Here, indications formed by the synergistic effect of a printed design and visible patterns produced by the above heat writing will be explained.

FIGS. 6(a) and (b) are plan views for explaining how indications are formed by writing visible patterns in a magnetic card which is an example of the magnetic recording medium of this invention.

FIG. 6(a) is an unused magnetic card on the surface of which "DATE" 16a, "CHARGE" 16b, "REMAINDER" 16c and lines 16d are previously formed as the above printed design 16.

FIG. 6(b) indicates a used magnetic card wherein the date of use 22a, the charge 22b and the remainder sum 22c are recorded in given positions corresponding to the above printed designs 16a, 16b and 16c by such visible pattern writing as explained according to FIG. 3.

In the magnetic recording medium of this invention, it is also possible to perform the above conventional visible pattern writing on the surface of the base 2 opposite to the magnetic recording layer 4.

According to this invention mentioned above in which a heat sensitive layer is formed on a magnetic recording layer and a metallic thin layer is formed on the heat sensitive layer, visible patterns such as letters, marks, and figures can be written on the magnetic recording layer and therefore both the magnetic recording area and the visible pattern writing area can be sufficiently large.

What is claimed is:

1. A magnetic recording medium wherein visible patterns can be written by thermal recording, in which a magnetic recording layer is arranged on a base and covers the entire upper surface of said base, an intermediate layer is arranged on the magnetic recording layer and covers the entire upper surface of said magnetic recording layer, a metallic layer having a thickness of 50 to 5000 Angstroms is arranged on the intermediate layer and covers the entire upper surface of said intermediate layer, and a wear-resistant layer is arranged on the metallic layer and covers the entire upper surface of said metallic layer, said metallic layer acting as a layer for said thermal recording and being removable by heating by way of energy transmitted through said wear-resistant layer to form the visible patterns, said magnetic recording layer also acting as a contrast layer for said thermal recording, said intermediate layer acting as a layer for partially absorbing the energy transmitted through said wear-resistant layer and said metallic layer to enhance a sensitivity of the thermal recording, and said thermal recording being performed to form said visible patterns by partially removing the metallic layer to provide a contrast between the metallic layer at a first area of the medium where the metallic layer remains and the magnetic recording layer at a second area of the medium where the metallic layer is removed.

2. A magnetic recording medium as set forth in claim 1, wherein the metallic layer has a surface roughness such that light is diffusely reflected.

3. A method for producing the magnetic recording medium as set forth in claim 2, said method including the steps of:

forming the intermediate layer so that said intermediate layer has a surface roughness such that light is diffusely reflected, said surface being obtained by addition of particles to material of the intermediate layer; and thereafter forming the metallic layer on the surface of the intermediate layer by deposition so that said metallic layer has said surface roughness such that light is diffusely reflected.

4. A method as set forth in claim 3, wherein said surface roughness is between about 0.1 to 2.0 micrometers.

5. A method as set forth in claim 4, wherein said surface roughness is between 0.3 and 1.0 micrometers.

6. A magnetic recording medium as set forth in claim 2, wherein said surface roughness is between about 0.1 to 2.0 micrometers.

7. A magnetic recording medium as set forth in claim 6, wherein said surface roughness is between 0.3 and 1.0 micrometers.

8. A method for using the magnetic recording medium as set forth in claim 1 which is characterized by writing information corresponding to at least a part of the information recorded magnetically in the magnetic recording layer as visible patterns by the thermal recording.

9. A method for using the magnetic recording medium as set forth in claim 8, wherein the magnetic recording medium has a design as a part of desired visual indications and the visible patterns are written as another part of the desired visual indications.

10. A magnetic recording medium as set forth in claim 1, wherein said intermediate layer is transparent.

11. A magnetic recording medium wherein visible patterns can be written by thermal recording, in which a magnetic recording layer is arranged on a base and covers the entire upper surface of said base, an intermediate layer is arranged on the magnetic recording layer and covers the entire upper surface of said magnetic recording layer, a metallic layer having a thickness of 50 to 5000 Angstroms is arranged on the intermediate layer and covers the entire upper surface of said intermediate layer, and a wear-resistant layer is arranged on the metallic layer and covers the entire upper surface of said metallic layer, said metallic layer acting as a layer for said thermal recording and being removable by heating by way of energy transmitted through said wear-resistant layer to form the visible patterns, said magnetic recording layer also acting as a contrast layer for said thermal recording, said intermediate layer acting as a layer for partially absorbing the energy transmitted through said wear-resistant layer and said metallic layer to enhance a sensitivity of the thermal recording, and said thermal recording being performed to form said visible patterns by partially removing the metallic layer to expose a part of the magnetic recording layer so as to provide a contrast between the remaining metallic layer and the exposed magnetic recording layer.

12. A magnetic recording medium as set forth in claim 11, wherein said intermediate layer is transparent.

* * * * *